Nov. 6, 1951   J. R. BLIZZARD   2,573,949
DISSOLVING OF POLYMERS
Filed Dec. 21, 1946   2 SHEETS—SHEET 1

INVENTOR.
James Robert Blizzard,
BY Charles F. Daley
ATTORNEY

Nov. 6, 1951
J. R. BLIZZARD
2,573,949
DISSOLVING OF POLYMERS
Filed Dec. 21, 1946
2 SHEETS—SHEET 2
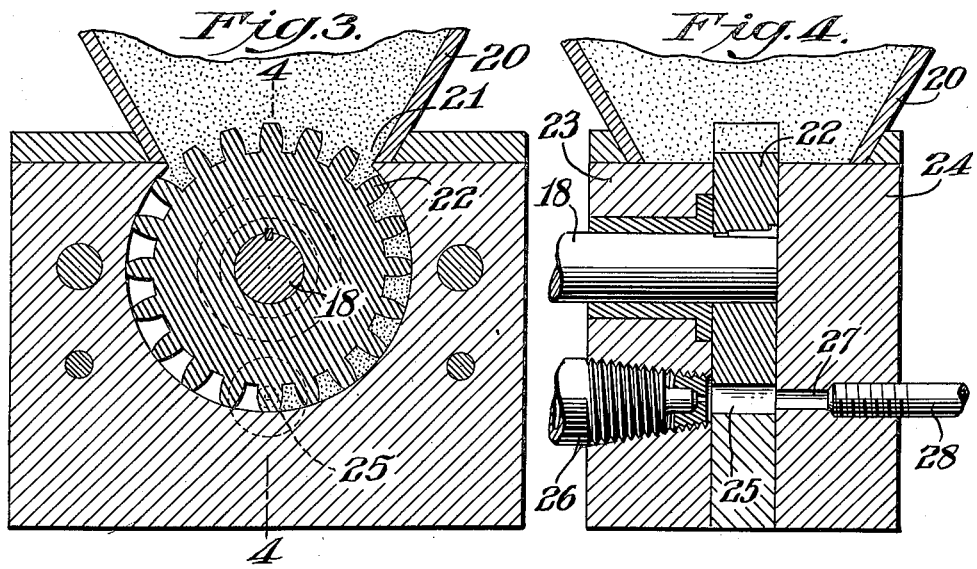
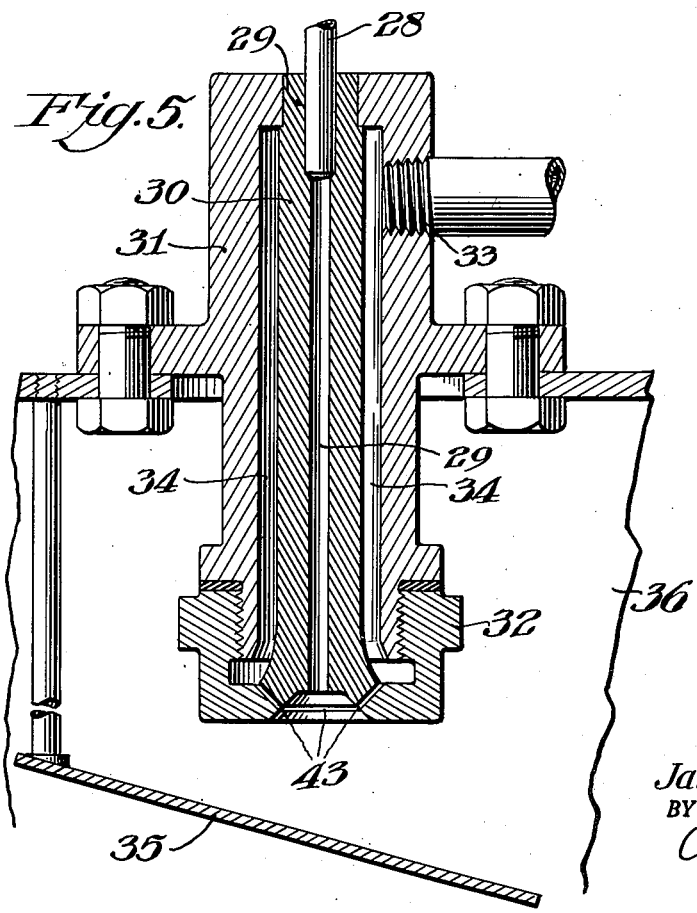
INVENTOR.
James Robert Blizzard,
BY
Charles F. Daley
ATTORNEY Patented Nov. 6, 1951

2,573,949

UNITED STATES PATENT OFFICE 2,573,949

DISSOLVING OF POLYMERS

James Robert Blizzard, Buffalo, N. Y., assignor to E. I. du Pont de Nemours & Company, Wilmington, Del., a corporation of Delaware Application December 21, 1946, Serial No. 717,655

15 Claims. (Cl. 260—32.4)

This invention is concerned with the dissolving of materials which cannot be readily and uniformly dissolved and it pertains more particularly to a general provision for effecting economical and uniform solution of polymers which, when mixed with solvent, gradually swell and then pass into solution from the swollen state, usually by the application of heat.

The solution of such polymers, as, for example, of polyacrylonitrile in dimethyl formamide, is attended with considerable difficulty. Thus, a polymer which has such solubility characteristics and which is divided into suitable particle size, generally swells initially when mixed with the solvent by imbibing the solvent. The degree of swelling gradually increases and there results by a slow and imperceptible series of steps an actual solution of the polymer in the solvent. The solvent must initially diffuse through the polymer particles, thereby swelling the particles before solution takes place, the polymer (particularly if it be of high molecular weight) being sticky and gummy in the swollen state. In order to hasten the dissolving of the polymer, it is commonly first ground to a particle size of 20 mesh or smaller to present a large total surface towards the solvent. When the solvent and finely divided polymer, in the proportions desired in the final solution, are brought together with mixing, the portion of the polymer first wetted out with solvent swells and becomes gummy. Together with the remainder of the polymer, this gummy material forms balls which contain in their interior less swollen or even dry portions of polymer. Thus, large dimensions of polymer are again generated, thereby rendering the dissolving process slow by increasing its dependence on diffusion. Application of heat is usually required. Thus, the solution of polyacrylonitrile in dimethyl formamide is normally effected by the use of elevated temperature to hasten the dissolving process. The application of heat is accompanied by discoloration of the mass and the imparting of poor color to the ultimate shaped product. It is likely also that undesirable depolymerization of the polymer takes place to some extent under the influence of heat. These undesirable results are more marked where higher temperatures and longer periods of heating are used.

In respect to polyacrylonitrile, to which polymer this discussion is largely directed for illustrative purposes, various methods have been suggested for overcoming the difficulties pointed out above. Thus, it has been suggested that a low boiling, liquid non-solvent be added to the solvent in a quantity sufficient to reduce its dissolving power so that a slurry of unswollen particles may be formed, the slurry being heated with mixing to drive off the non-solvent and bring the polymer into solution; the heating, however, tends to develop undesirable discoloration of the resultant solution. Another suggestion embodies the addition of gaseous acidic anhydrides to the solvent to diminish the solvent power. A slurry is formed, and subsequent heating is employed to drive off the gaseous material and to bring the polymer into solution. In this procedure, heating at 100° C. and above for prolonged periods, such as three hours, is utilized to effect complete solution of the polymer. In the course of the heating, the slurry becomes more viscous and the subsequently evolved gases cause undesirable foaming of the mass. In addition, the use of acidic gases represents an appreciable expense, for the handling of such gases presents certain problems in the commercial utilization of the polymer.

It has, furthermore, been suggested that the slurrying of polymer and solvent be carried out at a low temperature by the use of cold solvent, thereby reducing the solvent power of the solvent, the slurry being subsequently heated to form the solution. The optimum temperatures used in this procedure are below 0° C. and may be as low as —50° C. The use of such low temperatures entails considerable expense. It is difficult to form the solution of the polymer economically and efficiently by purely mechanical means; thus, even though a dilute solution of the polymer is initially formed at room temperature by the use of a mixer, it is required that this be converted into a more concentrated solution for the intended use. The use of a mixer for folding-in and dissolving further polymer in the dilute solution not only requires additional heating, but mixers capable of forming a solution with low viscosity solvent cannot exert the required folding in action on a viscous solution or slurry, the reverse also being true.

An object of this invention is the provision of a general mechanism for the preparation of solutions of high polymers. It is a further object of the present invention to form by an efficient and inexpensive procedure a slurry comprised of finely divided polymer particles in a solvent with the individual polymer particles being surrounded with solvent sufficient to effect their solution, the polymer being easily converted thereafter into the desired homogeneous solution by subsequent treatment. A still further object pertains to the dissolving of acrylonitrile polymers in solvents with the use of minimum temperature and short periods of heating. An additional object is the devising of a method for dissolving polymers of acrylonitrile which is simple, which requires a minimum of equipment and which is readily adapted to commercial, large scale operations. Other objects of the invention will appear hereinafter.

The objects of the invention are accomplished in general by suspending polymers in the form of particles having a size of 20 mesh or smaller in high velocity gas which is preferably an inert gas such as nitrogen, forcing the polymer-gas mixture through a small orifice or nozzle into intimate contact with a stream or streams of liquid solvent at room temperature, effecting confluent flow of the solvent-polymer-gas mixture after intermingling and causing the same to impinge on a suitable surface, after which it is collected in a suitable vessel, heated to form a homogeneous solution and thereafter transported to the point of use. The polymer and solvent may readily be metered in the practice of the invention to form a slurry having the proper proportions of polymer and solvent for conversion into the desired solution.

The invention may be better understood by reference to the accompanying drawings in which:

Figure 3 is a sectional elevation on line 3—3 of Figure 1 of the metering gear 22;

Figure 4 is a sectional elevation on line 4—4 of Figure 3, and

Figure 5 is a sectional elevation on line 5—5 of Figure 1 of a mixing nozzle and contiguous apparatus for effecting mixing of the solvent and polymer and the formation of a slurry.

Figure 1:
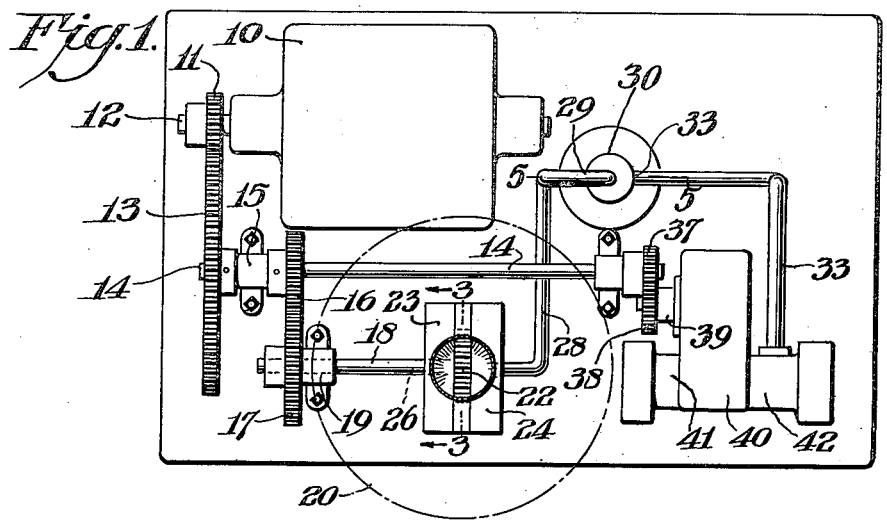
Figure 1 represents a diagrammatic, plan view of apparatus which may be utilized in practicing the invention.
Figure 2:
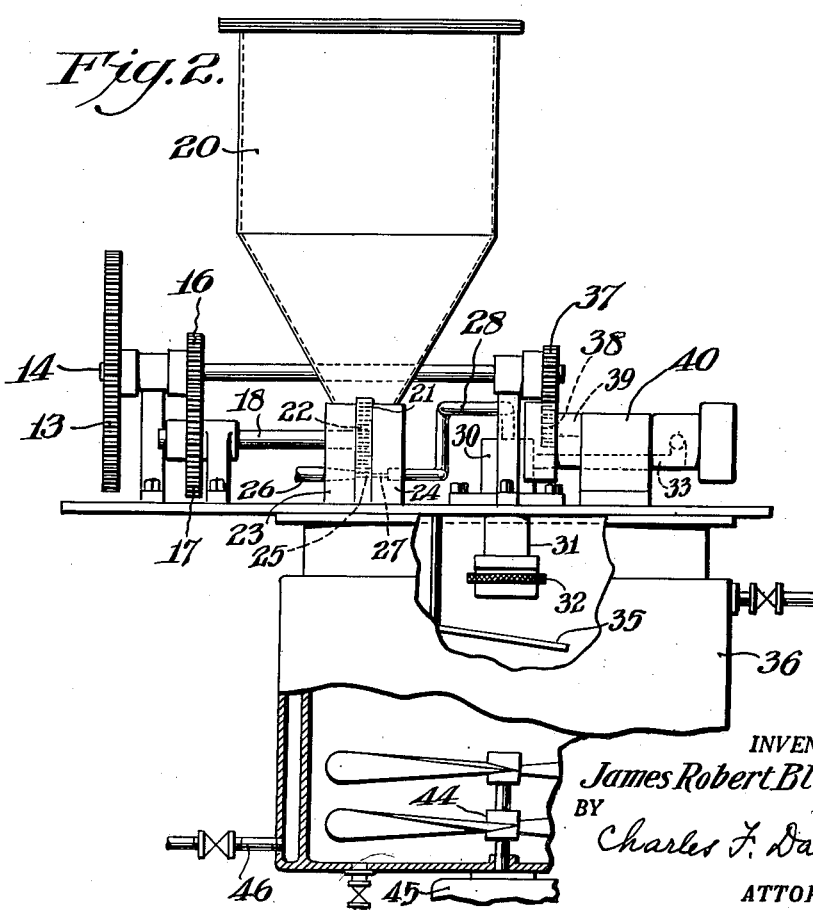
Figure 2 illustrates a side elevation, partially in section, of the apparatus showing means for feeding and mixing powdered polymer and the impelling gas.

Referring to the drawings, in which like numerals refer to like parts, motor 10 (Figure 1) drives gear 11 mounted on motor shaft 12 meshing with gear 13 mounted on shaft 14 which rotates in bearing 15. Gear 16 is mounted for rotation with shaft 14 driven by gear 13 and meshes with gear 17 mounted on and rotating shaft 18 which is positioned in bearing 19. A supply hopper 20 for powdered polymer is provided with an exit opening 21. Gear 22 (Figures 2, 3 and 4) mounted for rotation with shaft 18 is a metering gear which is disposed to pass through opening 21 of the hopper and to meter polymer at the desired rate, the gear carrying the polymer between plates 23 and 24 in which the gear is encased. The metering gear as it rotates deposits polymer in passage 25, one end of which is connected with a gas inlet pipe 26 through which nitrogen or air or other suitable gas is introduced into passage 25 at high velocity, said gas mixing with and impelling the powdered polymer through passage 27 in plate 24 to pipe 28. Pipe 28 is connected with passage 29 centrally disposed in a tubular member 30. Tubular member 30 is so mounted in shell 31 (Figure 5) as to provide a clearance 43 between the bottom of member 30 and the jet head 32, this clearance being composed of a number of minute passages or an annular passage. Head 32 is threaded on to a shell 31 into which, at its upper end, tubular member 30 fits tightly so as to prevent leakage. Clearance is provided between shell 31 and tubular member 30, to form a chamber 34, a solvent passage 33 being provided at the upper end of shell 31 so as to introduce solvent in liquid form into chamber 34 disposed between shell 31 and tubular member 30. The jetting of the high velocity gas stream containing polymer and the jetting of solvent passing between the base of tubular member 30 and the jet head 32 causes the two streams to be intermingled thoroughly immediately below the jet head, the mixing being assisted by impact of the mixture on a plate 35 disposed in close proximity to the bottom of the jet head 32, slurry formation taking place very quickly at that point. The slurry collects in chamber 36 disposed around plate 35 and may be led off to a reservoir.

Preferably the collecting chamber 36 is also the heating vessel in which the slurry is deaerated by vacuum and the polymer dissolved. The chamber 36 may be equipped with a conventional mixer 44 driven by motor 45. The chamber may be heated by any conventional means as, for example, electrically or by means of a jacket containing hot oil. Such a heating chamber may be directly connected through a withdrawal pipe 46 with an extruding device such as a spinneret from which the solution of polymer is emitted into an atmosphere sufficiently hot to drive off the solvent and thereby solidify the polymer in the desired form.

Shaft 14 is shown (Figures 1 and 2) connected to a gear 37 meshing with gear 38 mounted on pump shaft 39 which drives a metering pump 40. Solvent is introduced into the chamber 41 and is metered therefrom by the metering pump into a pipe 42 which is connected with solvent inlet 33 of the jet mixer.

The operation of the apparatus which is described may be carried out as follows: Polymer is ground to the desired mesh size of 20 mesh per inch or less and is charged into supply hopper 20. Motor 10 is started and the metering gear 22 begins to withdraw polymer from the hopper, the speed of the metering gear 22 and the speed of the metering pump 40 being regulated to deliver polymer and solvent to the jet mixer in the approximate proportions desired in the final solution. The solvent and polymer are separately introduced into the jet mixer at room temperature or thereabouts, the gas velocity being of considerable magnitude so as to insure proper propulsion of the polymer, and impingement with considerable force against plate 35. Removal of the gas from the slurry is desired prior to utilizing the solution for the production of shaped articles. Thus the slurry may be subjected to vacuum to drive off the gas. The air may also be removed while the slurry is being heated to effect solution. In any event, by the operation described, each particle of polymer is separately surrounded with solvent and is free from agglomerations, being therefore adapted for relatively rapid solution by heating, without discoloration and without foaming occurring as the mass becomes more viscous.

The following example, which is illustrative rather than limitative, describes a mode of applying the invention. In the example and throughout the specification, parts, percentages and proportions are by weight unless otherwise specified.

Example

Polyacrylonitrile, ground to mesh size of 20 mesh per inch and having a high molecular weight, as indicated by its intrinsic viscosity of 18.0 liters per mole at 0.2% concentration, is loaded into a hopper and is fed by the metering gear into a stream of air having a velocity at the mixer nozzle air orifice of about 89.5 feet per second. This orifice has a diameter of 0.135 inch. The volume of air flow, calculated for 65° F. and atmospheric pressure, is 0.0053 cubic feet per minute. The air-polymer mixture passes by virtue of the air flow to the jet mixer at a rate of 59.2 grams of polymer per minute. Dimethyl formamide is metered to the jet mixer at the rate of 310.8 grams per minute, the ratio of polymer to solvent being such as to yield a solution containing 16 per cent of polyacrylonitrile. The temperature of the solvent introduced into the jet mixer is 75° F. with the polymer-air mixture being at room temperature (75° F.). The slurry forming below the nozzle of the jet mixer is of uniform consistency and is immediately removed to a heating chamber where it is heated over a period of 5 minutes to 100° C. and maintained at that temperature for 25 minutes, complete solution of the polymer and solvent being thereby effected. The solution is continuously withdrawn to a spinneret and extruded through the spinneret at the desired jet velocity into a heated atmosphere in which the solvent is evaporated, the yarn being collected in any suitable fashion.

It will be understood that any means of imparting heat in the passage of the various components to and through the jet mixer may be utilized. Thus, the stream of gas may be heated prior to introduction into the apparatus and the metering pump and the solvent chamber cooperating therewith may be jacketed with steam, hot water or the like for the purpose of heating the solvent prior to its introduction into the jet mixer. Thus, the temperature of the solvent introduced may be varied to accommodate the particular solubility characteristics of the polymer being dissolved. Likewise, the air-polymer mixture may be heated to various temperatures. It is preferred for the system of polyacrylonitrile-dimethyl formamide that these temperatures be in the neighborhood of 20° C. to 30° C.

Likewise, the velocity and volume of the gas, and the rates at which polymer and solvent are fed to the nozzle may be varied to obtain the optimum conditions for slurry formation. The time of heating, the temperature and pressure at which the slurry is deaerated depend upon the amount of gas contained in the slurry and the vapor pressure of the solvent used. The additional time of heating required to effect complete solution depends upon the nature of the polymer system, the fineness of the polymer size, etc.

While the above discussion has referred in particular to polyacrylonitrile, other polymers can be rapidly and efficiently dissolved in appropriate solvents by the use of the apparatus and process of this invention. For example, copolymers of acrylonitrile with a vinyl ester, a vinyl halide, a vinylidene halide or other ethylenic compounds such as ethylene or butadienes may be dissolved by means of the apparatus and process of this invention. Likewise solutions of polyvinylchloride or polyvinyl acetate, polystyrene, or interpolymers thereof, may be easily prepared by this invention.

The solutions of the various polymers are useful in the manufacture of films, filaments, yarns and the like, impregnating fabrics and the like and, in general, wherever solutions of the polymers find application.

Any departure from the above description which conforms to the process and apparatus of this invention is intended to be included within the claims below.

I claim:

1. A process which comprises commingling with a gas traveling at high velocity a polymer to form thereby a polymer-gas mixture; jetting a solvent for said polymer into said polymer-gas mixture to obtain thereby a polymer-gas-solvent mixture in the form of a high velocity jet; and collecting said polymer-gas-solvent mixture in the form of a slurry in a vessel.

2. A process in accordance with claim 1 wherein said polymer is polyacrylonitrile.

3. A process in accordance with claim 1 wherein said polymer is polyacrylonitrile and said solvent is dimethyl formamide.

4. A process which comprises commingling with a gas traveling at high velocity a polymer to form thereby a polymer-gas mixture; jetting a solvent for said polymer into said polymer-gas mixture to obtain thereby a polymer-gas-solvent mixture in the form of a high velocity jet; and impinging said polymer-gas-solvent mixture against a surface.

5. A process which comprises commingling with a gas traveling at high velocity a polymer to form thereby a polymer-gas mixture; jetting a solvent for said polymer into said polymer-gas mixture to obtain thereby a polymer-gas-solvent mixture in the form of a high velocity jet; impinging said polymer-gas-solvent mixture on a surface; collecting said polymer-gas-solvent mixture in the form of a slurry in a vessel; and heating it until solution of said polymer in said solvent is effected.

6. A process which comprises commingling with a gas traveling at high velocity a polymer to form a polymer-gas mixture; jetting a solvent for said polymer into said polymer-gas mixture to obtain thereby a polymer-gas-solvent mixture in the form of a high velocity jet; impinging said polymer-gas-solvent mixture against a surface; collecting said polymer-gas-solvent mixture in the form of a slurry in a vessel; heating said slurry until solution of said polymer in said solvent is effected; and degassifying said solution.

7. A process which comprises feeding finely divided polymer particles at a fixed rate into a jet of gas traveling at high velocity to form a mixture composed of gas and polymer particles; jetting a solvent for said polymer into the polymer-gas mixture to obtain thereby a polymer-gas-solvent mixture in the form of a high velocity jet; impinging said polymer-gas-solvent mixture against a surface; collecting the resultant slurry in a vessel; heating said slurry until solution of said polymer in said solvent is effected; and degassifying said solution.

8. Apparatus for forming solutions of polymers comprising a receptacle for polymer particles; a chamber; a conduit into said chamber for a gas moving at high velocity; situated between said receptacle and said chamber a metering gear for feeding said particles into said chamber to obtain a mixture of said gas and said particles; a conduit in said chamber for feeding said mixture into a second chamber; a conduit in said second chamber for feeding a solvent for said particles into said chamber to obtain a mixture of gas, polymer particles and solvent in the form of a high velocity jet; an outlet in said second chamber; and a surface close to said outlet upon which said jet impinges.

9. Apparatus for forming solutions of polymers comprising a receptacle for polymer particles; a chamber; a conduit into said chamber for a gas moving at high velocity; situated between said receptacle and said chamber a metering gear for feeding said particles into said chamber to obtain a mixture of said gas and said particles; a conduit in said chamber for feeding said mixture into a second chamber; a conduit in said second chamber for feeding a solvent for said particles into said chamber to obtain a mixture of gas, polymer particles and solvent in the form of a high velocity jet; an outlet in said second chamber; and a surface close to said outlet upon which said jet impinges to form a slurry; and a receptacle for said slurry.

10. Apparatus in accordance with claim 9 which includes means for heating said slurry.

11. Apparatus in accordance with claim 9 which includes means for heating said slurry to form a solution and means for degassifying said solution.

12. Apparatus comprising a chamber for commingling a polymer with a gas traveling at high velocity to form a high velocity jet; a second mixing chamber for the resultant polymer-gas mixture with a solvent for said polymer to form a polymer/gas/solvent mixture traveling as a jet; and a receptacle for the resultant slurry.

13. Apparatus comprising a chamber for commingling at a controlled rate a polymer with a gas traveling at high velocity to form a high velocity jet; a second chamber for mixing at a controlled rate the resultant polymer-gas mixture with a solvent for said polymer to form a polymer/gas/solvent mixture traveling as a jet; and a receptacle for the resultant slurry.

14. A process which comprises metering a polyacrylonitrile polymer into a stream of air having a velocity of about 89.5 ft. per second; passing into the resultant mixture dimethylformamide at the rate of about 310.8 grams per minute; passing the resultant polymer/air/dimethylformamide mixture into a heating chamber; and heating this mixture at about 100° C. to effect solution of the said polymer in dimethylformamide.

15. A process which comprises passing a polyacrylonitrile polymer ground to a mesh size of 20 mesh per inch into a stream of air having a velocity of about 89.5 ft. per second; metering into the resultant polymer/air mixture, flowing at the rate of about 59.2 grams of said polymer per minute, dimethylformamide at the rate of about 310.8 grams per minute; impinging the resultant polymer/air/dimethylformamide mixture against a surface and collecting the resultant slurry in a heating chamber; and heating this slurry at about 100° C. to effect solution of the said polymer in the said dimethylformamide.

JAMES ROBERT BLIZZARD.

REFERENCES CITED

The following references are of record in the file of this patent:

UNITED STATES PATENTS

| Number | Name | Date |
|---|---|---|
| 1,295,283 | Riebold | Feb. 25, 1919 |
| 1,668,136 | Agthe | May 1, 1928 |
| 1,859,992 | Seil | May 24, 1932 |
| 2,125,860 | Sommer | Aug. 2, 1938 |
| 2,358,963 | Davis | Sept. 26, 1944 |
| 2,396,752 | Roddy | Mar. 19, 1946 |
| 2,404,713 | Houtz | July 23, 1946 |
| 2,460,884 | Hjort | Feb. 8, 1949 |